US008670533B1

(12) United States Patent
Hingoranee et al.

(10) Patent No.: US 8,670,533 B1
(45) Date of Patent: Mar. 11, 2014

(54) SYSTEMS AND METHODS FOR MANAGEMENT AND DISSEMINATION OF INFORMATION FROM A CONTROLLED ENVIRONMENT FACILITY

(75) Inventors: Rajesh R. Hingoranee, Plano, TX (US); Richard Falcone, Addison, TX (US); Randy Hoffman, Plano, TX (US); LeAnn Estes Hoffman, legal representative, Plano, TX (US); Michelle L. Polozola, Richardson, TX (US); Luke Keiser, Frisco, TX (US); Marc Hite, Plano, TX (US); Lee R. Johnson, Allen, TX (US)

(73) Assignee: Securus Technologies, Inc., Dallas, TX (US)

( * ) Notice: Subject to any disclaimer, the term of this patent is extended or adjusted under 35 U.S.C. 154(b) by 2043 days.

(21) Appl. No.: 11/810,691

(22) Filed: Jun. 6, 2007

Related U.S. Application Data

(63) Continuation-in-part of application No. 10/952,327, filed on Sep. 28, 2004, now Pat. No. 7,519,169.

(51) Int. Cl.
*H04M 15/00* (2006.01)
(52) U.S. Cl.
USPC .................. 379/114.13; 379/114.12
(58) Field of Classification Search
USPC ............. 379/114.01, 114.1, 114.13, 114.2, 379/114.21, 114.22, 114.23, 144.01, 379/144.02, 210.02, 211.02
See application file for complete search history.

(56) References Cited

U.S. PATENT DOCUMENTS

| 5,185,781 | A | | 2/1993 | Dowden et al. | |
|---|---|---|---|---|---|
| 5,210,789 | A | | 5/1993 | Jeffus et al. | |
| 5,448,625 | A | * | 9/1995 | Lederman | 379/88.25 |
| 5,517,555 | A | | 5/1996 | Amadon et al. | |
| 5,627,887 | A | | 5/1997 | Freedman | |
| 5,655,013 | A | | 8/1997 | Gainsboro | |
| 5,832,068 | A | | 11/1998 | Smith | |
| 5,937,044 | A | | 8/1999 | Kim | |
| 5,970,124 | A | * | 10/1999 | Csaszar et al. | 379/88.18 |
| 6,282,276 | B1 | | 8/2001 | Felger | |
| 6,353,663 | B1 | | 3/2002 | Stevens et al. | |
| 6,377,938 | B1 | | 4/2002 | Block et al. | |
| 6,397,055 | B1 | | 5/2002 | McHenry et al. | |
| 6,405,028 | B1 | | 6/2002 | DePaola et al. | |

(Continued)

OTHER PUBLICATIONS

U.S. Appl. No. 09/640,831, Swope, et al.

(Continued)

*Primary Examiner* — Duc Nguyen
*Assistant Examiner* — Assad Mohammed
(74) *Attorney, Agent, or Firm* — Fogarty, L.L.C.

(57) ABSTRACT

Dissemination of information from a controlled environment facility employs facility information management functionality managing resident information and facility information, and call manager functionality selectively providing at least a portion of the resident information and/or the facility information to an outside party and/or professionals associated with the facility in an automated manner. The invention may employ outgoing IVR functionality to provide select portions of the resident information to appropriate professionals at the time of intake of a new resident. The invention may conduct a reverse auction among professionals offering a particular good or service, manage information related to providers of services or goods for residents of a facility, provide an outside party this information including results of a reverse auction, and notify a selected provider of selection of that provider by the outside party to provide goods or services for a resident.

69 Claims, 3 Drawing Sheets

(56) References Cited

U.S. PATENT DOCUMENTS

| | | | |
|---|---|---|---|
| 6,430,274 | B1 | 8/2002 | Winstead et al. |
| 6,434,378 | B1 | 8/2002 | Fougnies |
| 6,483,910 | B1 | 11/2002 | Council |
| 6,611,583 | B1 * | 8/2003 | Gainsboro .................... 379/188 |
| 6,639,978 | B2 | 10/2003 | Draizin et al. |
| 7,075,919 | B1 | 7/2006 | Wendt et al. |
| 7,096,193 | B1 * | 8/2006 | Beaudoin et al. ............ 705/26.1 |
| 7,158,621 | B2 * | 1/2007 | Bayne ...................... 379/114.13 |
| 2001/0028705 | A1 | 10/2001 | Adams et al. |
| 2002/0013520 | A1 * | 1/2002 | Okamoto ..................... 600/300 |
| 2002/0025028 | A1 | 2/2002 | Manto |
| 2002/0106065 | A1 | 8/2002 | Joyce et al. |
| 2002/0115424 | A1 | 8/2002 | Bagoren et al. |
| 2002/0136374 | A1 | 9/2002 | Fleischer, III et al. |
| 2002/0147002 | A1 | 10/2002 | Trop et al. |
| 2003/0002639 | A1 | 1/2003 | Huie |
| 2003/0008634 | A1 | 1/2003 | Laybourn et al. |

OTHER PUBLICATIONS

U.S. Appl. No. 10/135,878, Viola, et al.
U.S. Appl. No. 10/135,883, Falcone, et al.
U.S. Appl. No. 10/190,315, Falcone, et al.
U.S. Appl. No. 10/360,248, Falcone, et al.
U.S. Appl. No. 10/698,576, Falcone.
U.S. Appl. No. 10/720,732, Viola, et al.
U.S. Appl. No. 10/720,848, Viola, et al.
O'Harrow, Robert Jr., "U.S. Backs Florida's New Counterterrorism Database; 'Matrix' Offers Law Agencies Faster Access to Americans' Personal Records," The Washington Post; Washington D.C., Aug. 6, 2003, p. A.01.
O'Harrow, Robert Jr., "Database will make tracking suspected terrorists easier," The Dallas Morning News, Dallas, Texas, Aug. 6, 2003, p. 7A.

* cited by examiner

SYSTEMS AND METHODS FOR MANAGEMENT AND DISSEMINATION OF INFORMATION FROM A CONTROLLED ENVIRONMENT FACILITY

CROSS-REFERENCE TO RELATED APPLICATIONS

The present application is a continuation-in-part of co-pending U.S. patent application Ser. No. 10/952,327, entitled "SYSTEMS AND METHODS FOR THE MANAGEMENT AND DISSEMINATION OF INFORMATION FROM A CONTROLLED ENVIRONMENT FACILITY", filed Sep. 28, 2004. The present application is related to the following co-pending U.S. Patent Applications: Ser. No. 10/698,576, entitled "REVENUE MANAGEMENT SYSTEMS AND METHODS"; and Ser. Nos. 10/135,878, 10/720,732 and 10/720,848 each entitled "INFORMATION MANAGEMENT AND MOVEMENT SYSTEM AND METHOD" The disclosure of each of the above applications is incorporated herein by reference. The present application is also related to U.S. Pat. No. 7,042,992, entitled "SYSTEMS AND METHODS FOR ACCOUNT ESTABLISHMENT AND TRANSACTION MANAGEMENT USING INTERRUPT MESSAGING" and U.S. Pat. No. 6,836,540, entitled "SYSTEMS AND METHODS FOR OFFERING A SERVICE TO A PARTY ASSOCIATED WITH A BLOCKED CALL", the disclosures of which are incorporated herein by reference.

TECHNICAL FIELD

The present application broadly relates to telecommunication systems and specifically to systems and methods for the management and dissemination of information from a controlled environment facility.

BACKGROUND OF THE INVENTION

Management and dissemination of information are typically at the forefront of the administrative burdens for controlled environment facilities. Controlled environment facilities, as used herein, may include inmate facilities (e.g., municipal jails, county jails, state prisons, federal prisons, military stockades, juvenile facilities, and detention camps), or hospitals, nursing homes, camps, schools, and the like. An example of the aforementioned administrative burden in a correctional institution or detainment facility such as a county or municipal jail might arise when an individual is booked in as an inmate of the facility and questions are directed to that facility from friends, family, attorneys, and the like. Typically, a great number of questions, commonly from a number of telephone calls or visits, are directed to the facility's booking personnel asking for details related to the newly booked inmate and his circumstances. However, controlled environment facilities, particularly inmate facilities, may wish to avoid contact with friends and family, because in many cases these friends or family members are emotional, and the facility administrators may wish to avoid conflict. Similarly, information about the facility, such as visitation hours, location and the like, is constantly being sought by the public, friends and family of residents, or the like. Typically, controlled environment facilities do not employ automated information systems or the like. Additionally, scheduling visitation from friends, family and others, use of commissary facilities, and the like, raise other administrative functions to burden the facility. Managing transactions within a jail or the like, such as commissary deposits, medical payments, connecting with bail bondsmen, scheduling meetings and court dates with an attorney, and the like become tedious tasks for facility administrators.

Controlled environment facilities may have goods and service providers or service professionals registered or otherwise eligible to provide goods or services to residents of the facility. Examples of such service providers or professionals may include attorneys, bail bondsmen, and the like, registered or eligible to provide services to the residents of a municipal or county jail. It may be problematic for such professionals to be notified of the intake of new residents that may require the goods or services of the professional. Regardless, such professionals typically need to communicate with the jail to obtain information about clients and potential clients, as performance of services dictate. Typically, such professionals or service providers must place a telephone call to the facility to obtain information or such information must be obtained in person or through the mail. For example, in the case of a municipal or county jail, a bail bondsman might need to determine the charges against a suspect and any bond amounts or conditions that may have already been set. Attorneys may need similar information as well as information concerning court dates and the like. To obtain such information a profession might need to contact multiple parties. The dissemination of information to goods and service providers or service professionals may be a burden on the facility and obtaining this information may be time consuming for the provider or service professional.

As pointed out above, family members or friends typically desire information related to a resident of a controlled environment facility. For example, when a relative calls to obtain information related to a person recently arrested, such as charges, opportunities for visitation, personal item needs and the like, they speak to a booking officer or similar personnel in the jail. The booking officer may direct the friend or family member to somebody else to obtain some of the requested information. Several calls may be required to gather the desired information. Thereafter, the family or friends of the detained party may need to look for professional assistance for the detainee. For example, the friends or family may seek out the services of a bail bondsman and/or attorney. This may require research or at least consultation of a telephone directory, advertisements, or the like. Typically, the friends or family members would then need to confer with the professional(s) to determine if the professional(s) may be of assistance in this particular case. If assistance is not available from that professional, such as due to technical or time constraints (i.e. the professional is not registered with the facility, does not handle the types of matters involved, has other obligations of his or her time, or the like), then the friends and family must continue their search for assistance. Such a process is quite time consuming, often requiring days to complete. However, service professionals, and the like, oftentimes depend on calls coming from residents of a facility, or from friends or family of these residents, seeking their services. Problematically, no mechanisms exist to aid a professional in offering their services, particularly where the friends or family may seek best value goods or professional services.

SUMMARY

The present invention is directed to systems and methods which facilitate communication among a resident of a controlled environment facility, friends/family and a professional or other provider of goods or services, who is in a position to be of assistance. The present systems and methods may enable a controlled environment facility communications provider, or the like, to become, in effect, a broker of information for professionals and friends, and families of facility residents that need assistance from outside the facility, and, in effect, an agent for professionals who can provide that assistance. The present systems and methods preferably provide real-time, delayed, displaced, and/or transformed information concerning residents, particularly new residents, to professionals, and a professional through connection to such a professional, through multiple paths, including, by way of example, electronic mail, paging, voice messaging, text messaging, telephone call to wireless device and telephone call to wire-line device. The present systems and methods may also provide auction type services through which professionals may offer goods an/or services for residents in a competitive manner. The present systems and methods may also facilitate management of funds associated with the services provided by the professionals. Preferably, the present systems and methods employ automated technologies leveraged to provide the aforementioned features. For example, interrupt messaging such as disclosed in U.S. Pat. No. 7,042,992, entitled "Systems and Methods for Account Establishment and Transaction Management using Interrupt Messaging," incorporated herein by reference above, may be used.

Preferably the present systems and methods electronically manage and support the management and dissemination of information in a controlled environment facility to alleviate the challenges faced by facility personnel inundated with calls from outside the facility from professionals and/or families and friends of residents. The present systems and methods preferably extend technological solutions to offload repetitive administrative functions using digital/electronic systems and methods. The present systems and methods preferably employ a "follow me" approach to connect parties outside a facility (such as friends and family) with professional entities or individuals (such as bail bondsmen, attorneys, Probation Officers, etc) wherein a series of communication mediums are used in an attempt to disseminate new resident information to professionals or in an attempt to contact a professional with a friend or family member in as timely manner as possible. The present systems and methods may leverage the functionality disclosed in above incorporated U.S. Pat. No. 7,042,992. Utilizing the "follow me" approach, the present invention helps a facility develop effective business processes to alleviate the vast number of administrative tasks related to managing information, transactions, interaction with external parties such as the public at large, friends, family, outside goods and service providers, attorneys, bail bondsmen, and the like.

The present systems and methods alleviate the management and dissemination of information burdens and similar tasks normally handled by facility personnel, by developing and implementing methodologies to offload such tasks to electronic systems and methods and reduce or eliminate human interaction. The present systems and methods enable a controlled environment facility to efficiently and securely manage and disseminate information, perform administrative tasks, and manage time effectively. For example, information and tasks handled by the present systems and methods may include resident intake information, facility information, financial transactions, administrative tasks, professional service provider related activities and information, friend and family issues, and the like. To that end the present systems and methods offload select administrative tasks, both within the facility and outside, to electronic and/or digital systems and methods.

The present systems and methods may make use of facility management functionality, which may be provided in conjunction with an "Information Management and Movement System and Method" such as disclosed in U.S. patent application Ser. Nos. 10/135,878, 10/720,732, and 10/720,848, the disclosures of which are incorporated by reference above. Thereby, the present invention may manage resident information, such as a reason for being in the facility, personal information, intake or booking information, time spent at the facility, appointments, etc. The present invention may also manage facility information, such as visitation hours, administrative information, etc. Additional information, such as may be related to or pertain to outside parties, such as bail bondsmen, attorneys, family, probation officers, etc. for an incarceration facility example, may be managed in accordance with the present invention.

In accordance with embodiments of the present systems and methods information, such as, name, reason for being in the facility, and facility name, may be disseminated in a "broadcast" fashion to professionals associated with a facility. For example, if the facility is a jail, or the like, information may be disseminated to bail bondsmen and/or attorneys associated with the facility including the name of the inmate, alleged offence and the name of the jail. Additionally, the professionals may be provided contact information which will enable them to call the resident and/or friends and family directly to offer goods or services. Embodiments of the present invention may enable professionals to offer their services in a "bid" fashion in effect providing a "reverse-auction" of the goods or services offered by the professionals. These reverse auctions may entail more than just bidding to provide goods and/or services. The reverse auction may also be use to offer value added services, such as expedited bond services or the like.

In accordance with embodiments of the present invention, when a resident uses a resident telephone system, the present systems and methods may, particularly for a first telephone call made to a telephone number, generate an outgoing interactive voice response (IVR) message providing select information to the called party. Such an interrupt message may be provided in accordance with the disclosure of U.S. Pat. Nos. 7,042,992 and 6,836,540 both of which are incorporated by reference above. Information provided by the interrupt message might include information about the resident such as identity and reason for being in a facility, directions to a website where additional information can be found, and/or a telephone number that the called party can call to obtain additional information. This telephone number to call may be a "900" number or other toll number that will require the called party to pay a certain amount, such as per minute, when using this number to obtain this additional information.

The present systems and methods ensure that service professionals and the like, who are looking for business from residents of a facility, are connected in a timely manner, and preferably in an automatic manner, as opposed to waiting for a resident's friend or family to call. Likewise, the present invention enables a resident's family member or friend to be connected with a professional to facilitate providing the professional's service(s) to the resident.

The present invention provides benefits to the facility as well. The present systems and methods reduce administrative burdens on the facility not only by handling inquiries, but, by way of example, facilitating release of a detainee. The present systems and methods preferably enable a facility such as a municipal or county jail to facilitate bailing a detainee out, thereby reducing burdens and expenses of the jail by keeping the detainee population low.

Friends, family or other parties related to a resident calling the facility may be looking for information related to a new resident. As discussed above, such calls have typically been taken by facility personnel who may have some booking information on the inmate. However, in accordance with the present systems and methods such calls may be directed by an IVR system to access electronically stored information or to personnel who have the desired information more readily available. For example, in accordance with the present invention, a caller to a city or county jail may be presented with options such as "press 1 for inmate booking information, press 2 for facility hours, press 3 for visitation hours" and/or the like. Advantageously, the present invention eases administrative burdens on facility personnel and aids in eliminating conflicts that the facility personnel may have with the calling party, such as an inmate's family member.

Additionally, the time outside service providers spend on the telephone with the facility can be considerably minimized using technology that automatically provides needed information or that directs them to a resource for such information. Similarly, the facility's time on the telephone is minimized. For example, if an attorney calls a city or county jail to set up an appointment with an inmate, the IVR system can direct the attorney to the inmate database and provide scheduling information such as doctor's appointments, court appointments, or the like.

An IVR may link to the call manager functionality, enabling a function to be carried out by the calling party electronically. Linking such functionality to the capabilities of a call manager may allow a calling party to activate any of a number of functions by pressing a number, or in a similar manner. By way of example such function may include pre-arranging visitation hours, making commissary account deposits, ordering or refilling prepaid calling cards for a resident, obtaining resident information, providing credit card information for use in funding commissary accounts, managing debit or other accounts, and/or the like.

An IVR may also, or alternatively be linked to the aforementioned facility management functionality. The facility manager may be linked to an outgoing IVR for purposes such as tracking a resident's activities or use of facility services. For example, when a family member or friend calls into a jail to set up visitation appointments, the facility manager may determine an inmates' eligibility for visitation, and a database in the facility manager may manage the activities of the inmate, accordingly.

In most cases, when a friend or family member calls into a controlled environment facility, the first portion of the telephone call is spent on "lead-in" questions such as the name of the individual calling, etc. In accordance with the present invention an IVR system can be configured to direct the caller to another number where desired information may be available. For example, in the context of a county or city jail, the caller may be redirected to a telephone number of a person or system that can provide an inmate's booking information. However, in at least one embodiment, such functionality may be linked to the facility manager, which may maintain most, if not all, resident information. In accordance with the present invention, a friend or family member calling in may be directed to a number or be provided information on the resident automatically. The caller may also be directed to a number to dial or to punch where they can then access a commissary account for the resident. Therethrough, the caller may establish a commissary account and/or deposit funds for the resident to use.

Oftentimes, when a friend or family member calls a controlled environment facility to inquire about a new resident, the caller will wish to inquire about various services provided by outside parties for residents of the facility. For example, a family member calling a city or county jail may wish to inquire about the services of a bail bondsman or an attorney. In accordance with the present invention, the aforementioned facility manager may store information related to local service providers, such as local bail bondsmen and attorneys offering services available to an inmate of the facility. An IVR message can direct the family member to a list of bail bondsmen, a list of attorneys, or the like.

Once a listed outside service provider, such as a bail bondsman or attorney, is selected by the caller, the facility manager can forward an email message to the selected service provider, or utilize another medium of communication, such as may have been previously selected by the service provider, to contact the service provider. Preferably, the present systems and methods provide a professional access to a central IVR system, where the professional may call and access their messages. These messages may have previously been sent to the professional automatically, as discussed above, and may include dissemination of information about new residents. Thus, the present invention provides a three-way connectivity by connecting the resident with friends or family, and the friends or family with a professional for the provision of services.

The present system and methods may generate revenue for a practitioner of the present invention by charging the professional a subscription rate for access to obtain information stored in the database. Revenue may be generated for a party practicing the present invention by charging the outside service provider a flat rate for a listing on the IVR system. Additional revenues may be generated by charging a premium for expanded listings on the IVR system, or providing an outside service provider "top-billing." Alternatively, the names of the provider of a particular type of goods or services may be listed in an order of the results of the above-discussed reverse auction. Revenues may be generated by charging calling parties a per-call, or per-minute, rate for a 900-telephone number to access the IVR system. Revenues may further be enhanced through reduction of potential bad debt, such as through providing an incentive to outside service providers to prepay for listings using prepaid services such as associated with "Revenue Management Systems and Methods" disclosed in U.S. patent application Ser. No. 10/698,576, and/or by charging a fee to participate in the aforementioned reverse auctions.

Thus, the present invention may provide revenue from listing fees paid by professionals and/or fees associated with accessing the information, paid by a caller using a "900" number to access information. The present invention reduces administrative and personnel costs in facilities through automation of tasks presently completely in a manual, labor-intensive, time-consuming manner. Additionally, the present invention might reduce administrative, personnel, and advertising costs, for professionals who subscribe to the service, and provides new leads as well as help manage incoming new business inquiries.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION

Figure 1:
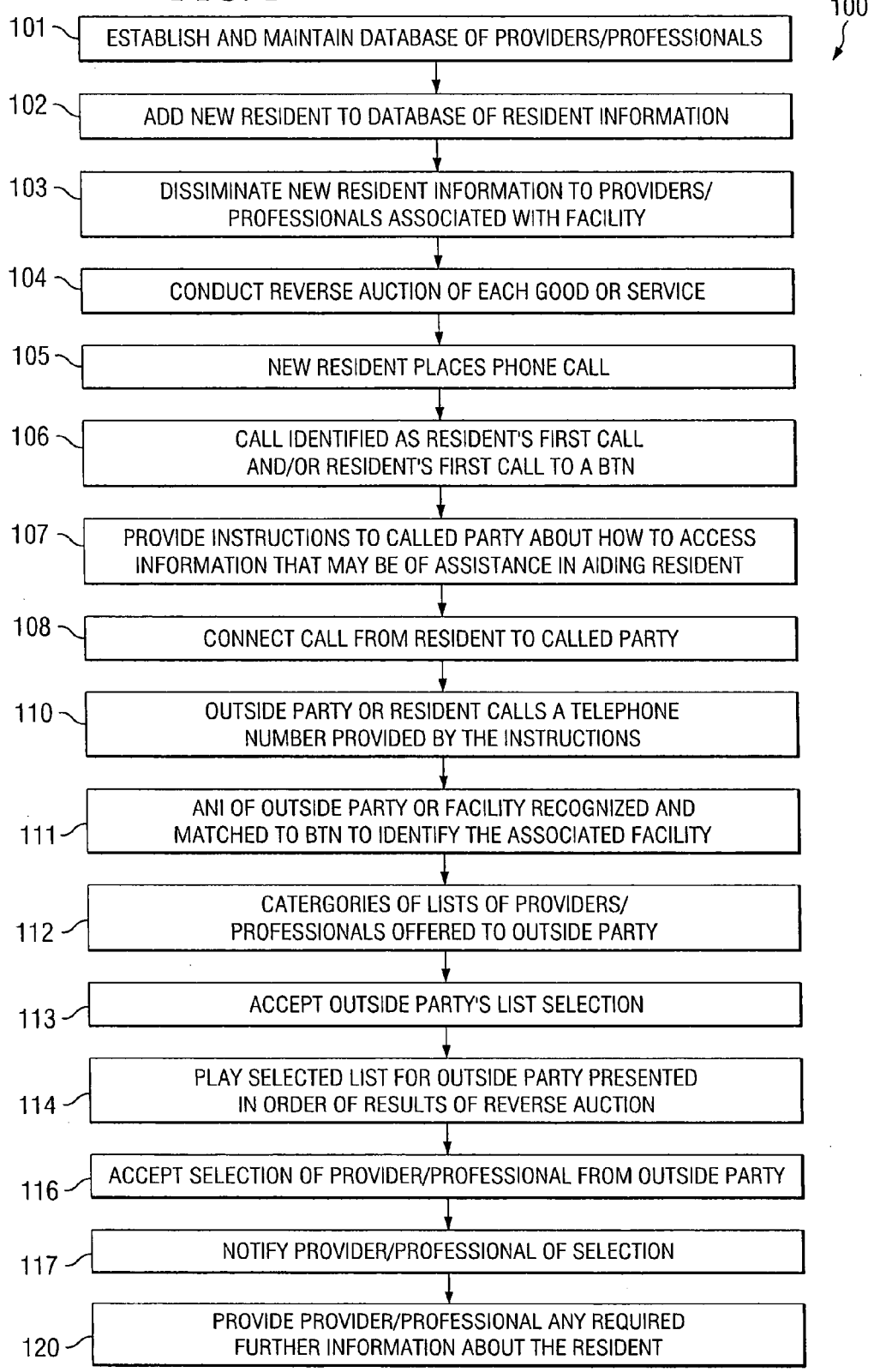
FIG. 1 is a flow chart of an embodiment of the present invention.

FIG. 1 is a flow chart of embodiment 100, a method for the management and dissemination of information in a controlled environment facility. In accordance with embodiment 100 a professional who provides services to residents of a controlled environment facility is included in an automated IVR-provided list of available professionals at 101. This list may be maintained as a database and may be associated with a facility and its surrounding area. In accordance with the present invention lists may be targeted to Billing Telephone Numbers (BTNs) who receive calls from residents of the particular facility. In other words, regardless of the geographical location of the BTN receiving a call, a list, or lists, provided to a called party will preferably be specific to the facility from which they received the call. A professional who is registered or otherwise eligible to provide goods and/or services to residents of a controlled environment facility may compensate a controlled environment facility communication service provider to be included in such an IVR-provided list of available professionals. Added compensation may be required of a professional to place "taglines" or similar advertising material with the listing or to move a professional to a top of a list in the absence of a reverse auction, such as discussed below.

At 102 information about a new resident is added to a database of facility resident information. This information may include the new resident's name, the reason the resident is in the facility, contact information for the resident and/or family members, such as, a home telephone number and/or address, and/or the like. The information might include information about a third party associated with the new resident. This information about a third party may include the identity of a person the resident identifies as responsible, to one degree or another, for financial matters related to the resident. In such a case, the information about the third party might include information that a provider of goods or services might find useful to "prequalify" a new resident for provisioning of the goods or services offered by the provider. For example, if the resident is an arrestee, he might provide an indication as to whether he or associated third parties such as his parents, own a home, information which a bail bondsman might use to prequalify the arrestee for bail, up to a certain amount.

Pertinent information about a new resident that may be of interest to a particular type of professional may be disseminations to that type of professional listed as associated with the residents' facility at 103. For example, the name and contact information of a new resident booked into a county jail for driving while under the influence (DUI) may be "broadcast" to all bail bondsmen and/or attorneys listed as associated with the county jail and that have indicated a desire to be notified of new DUI arrestees. The information disseminated might include information about a third party as discussed above. This dissemination may employ a "follow me" approach wherein a series of communication mediums are used in an attempt to contact the professional in as timely manner as possible. For example if a direct phone call to an office wire-line phone fails to reach a live recipient, a call to a wireless phone may be initiated, if that call fails to reach the desired individual or person related to the business an email and/or a page may be sent. At each point along this path voice mail or other messages may be left with pertinent information such as a call back number or website address to access for information.

In accordance with embodiments of the present invention, a reverse auction may be conducted at 104. This reverse auction enables professionals who offer a particular good or service to place a "lowest bid" for which they will provide that good or service. In the above example, the aforementioned DUI attorney may offer a flat rate to represent the new DUI arrestee. Notice of the lowest bid (or bids) for each good or service may be provided directly to the new resident, such as, the next time the resident provides identification information to place a phone call, and/or the results of the reverse auction may be provided to a resident and/or friend or family member as an ordered list when inquiring about goods or services as detailed below. Additionally, or alternatively a reverse auctions may entail more than just bidding to provide goods and/or services at a lowest price or cost. The reverse auction may also be used to offer value added services. For example, a bail bondsman's bid might include an offer to expedite bailing the resident out of the facility and/or a guarantee of the maximum time from the bondsman being retained until the resident will be bailed out.

The new resident may place a telephone call to an outside party at 105. By way of example, during the booking process, a detainee may be allowed to place a telephone call, such as to a friend or family member. This telephone call may be placed using a telephone provided by the aforementioned controlled environment communication service provider using a call manager functionality. Preferably, in accordance with the present systems and methods the call manger functionality identifies the telephone call as the first call to a BTN, and/or as the first call by the new resident, at 106.

At 107, before the connection is completed, the called party is provided an automated message that provides instructions for accessing information that may be useful to the called party in providing assistance to the calling resident. Such information may include a telephone number and/or website address to access for information concerning the resident's circumstance or status and a listing of outside service providers who may be of assistance to the resident. This message to the called party may be provided by an IVR associated with the aforementioned call manager functionality. Preferably at 108 the call from the resident to the outside party (friend or family member) is connected.

Subsequently, the called party, such as a friend or family member, or the resident may, at 110, call the telephone number provided in the preamble telephone message at 107. The call at 110 preferably accesses a centralized platform that recognizes the incoming Automatic Number Identification (ANI), matches it with the first call (at 105, or the facility itself) to identify the associated facility, and initiates an IVR message at 111. Preferably the IVR message at 112 offers the friend, family member, or resident, categories of professionals from which to select a list to review. The categories for a detention facility such as a city or county jail might include bail bondsmen, attorneys, probation officers, etc. A similar list for a nursing home facility or the like might include a listing of doctors, pharmacies, beauticians, cable television providers, specialty furniture retailers or rental centers, etc. The friend or family member may select a category at 113 and at 114 the IVR plays a list of professionals in that category. Preferably, the list includes service providers local to the area where the facility identified in step 111 is located and/or providers who are approved or otherwise acceptable to the facility.

Also, in accordance with embodiments of the present invention, the listed professionals are listed in an order reflective of the results of the reverse auction at 104. In the DUI example from above, if the category of professional selected at 112 was attorneys, the list of attorneys would be ordered such that the attorney who had bid the lowest flat rate to represent the DUI arrestee would be listed first, the attorney that had bid second lowest would be listed second, etc. However, the list might be ordered based on other reverse auction results, such as the attorney who could appear first. Given that all attorneys who had subscribed to be listed in DUI cases might not bid, all that had bid are first listed, in the order dictated by the results of the reverse auction, and those who had not bid might then be listed. These remaining attorneys may be listed in an order dictated by payment of fees for preferential listings and/or in accordance with other criteria.

At 116 the friend or family member selects a professional from the list and at 117 that professional is notified in accordance with the present systems and methods in a manner that the professional previously opted to be notified, such as when signing up for the service. The notification at 117 may include direct connection upon selection via wire-line or wireless phone, email, voice mail, or the like. Further, the notification at 117 may employ the aforementioned "follow me" approach discussed above.

Additionally or alternatively, a three-way call might be initiated, or be allowed to be initiated, between the resident, provider and outside party. Although in many controlled environment calling systems, such as prison phone systems, three-way calling is forbidden and blocked, in accordance with embodiments of the present invention, a three-way call might be initiated, or be allowed to be initiated, between the resident, a selected provider and an outside party. Further conference calls that include more than one provider, by way of example a conference call between, a jailed individual, an outside party who may be a surety, a bail bondsman, and an attorney, might be carried out in accordance with the present invention.

At 120 the good or service provider is preferably given information about the resident and the services required. The information provided to the provider preferably includes the name of the resident, any necessary identification number or the like, a reason for being in the controlled environment facility, and other data pertinent to provision of the goods or services of the provider. By way of example, a bail bondsman may receive such a notification via email, or may be directed to access information via a web page, via a telephone message, beeper message or the like. A form may be provided for the bail bondsman that can be filled-out from the information received. The bail bondsman can print out this form and take it to the facility to begin the bail process. This functionality may be extended to the provision of bail money to the facility. Similar functionality can be extended to attorneys, probation officers, and the like. Additionally or alternatively, a fee may be charged for the professional to access information about a resident for whom the professional has been selected to provide services. This fee may take the form of a subscription and may be associated with the aforementioned listing fee or the fee may be a one time fee that may be paid at the time the information is accessed, such as via a "900" call or use of a credit card.

Figure 2:
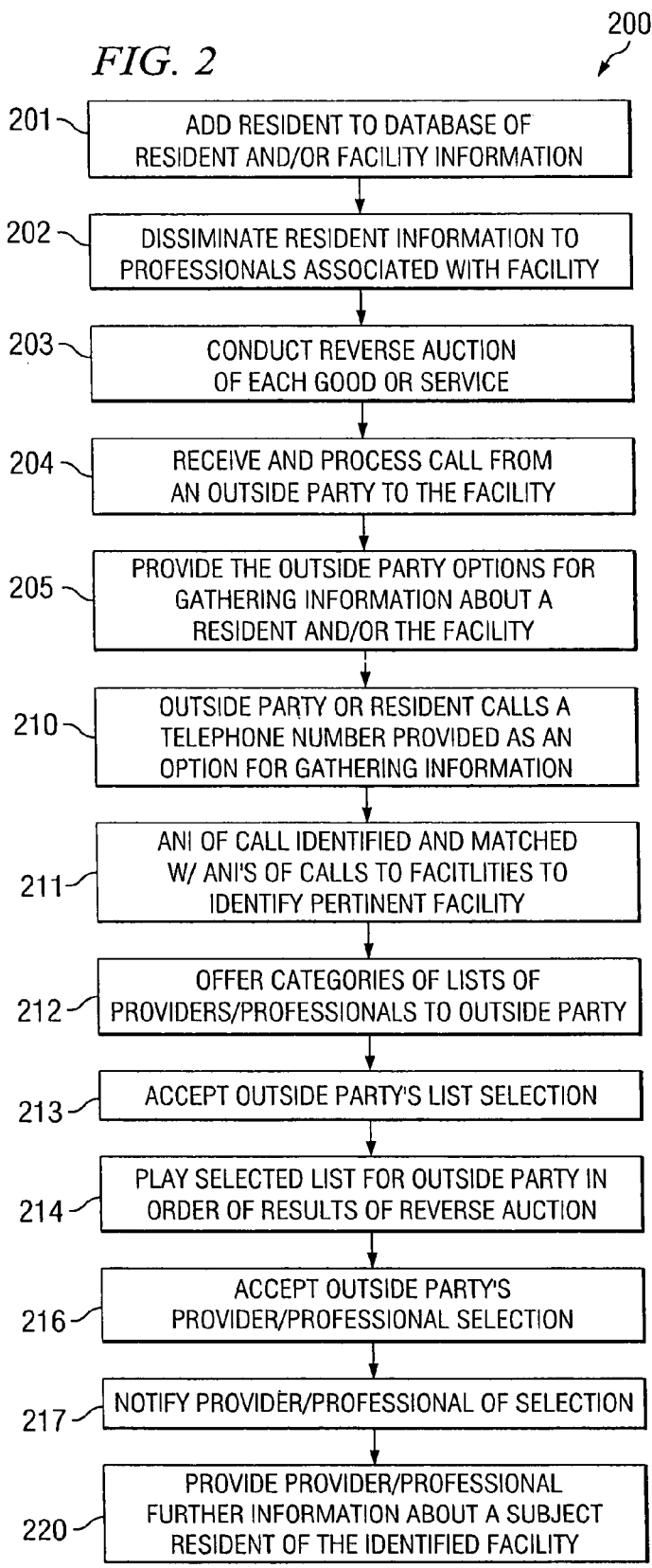
FIG. 2 is a flow chart of another embodiment of the present invention.

FIG. 2 is a flow chart of another embodiment (200) of a method for dissemination of information related to a resident of a controlled environment facility in accordance with the present invention. At 201, information about a new resident of the controlled environment facility is added to a database of information about residents of the controlled environment facility. Pertinent and appropriate information about a resident may be disseminated to particular types of professional associated with the facility at 202. This dissemination may employ the "follow me" approach discussed above. In accordance with embodiments of the present invention, a reverse auction of goods and/or services offered by the professionals may be conducted at 203.

At 204 a telephone call from an outside party to the controlled environment facility is received and processed. At 205 an interactive voice response unit or similar functionality is used to provide the outside party automated options for gathering information. This information may be information about the controlled environment facility, one of the residents, providers that provide goods or services to residents of the controlled environment facility and/or other information. The options provided at 205 for gathering information may include providing the outside calling party a website address or a telephone number, which may be a "900" service phone number.

At 210 a call from the outside party to a telephone number provided at 205 may be received and processed. At 211 an automatic number identification associated with the outside party is preferably identified and matched with an automatic number identification associated with the call to the controlled environment facility to identify the associated controlled environment facility. At 212 the outside party may be provided categories of lists of providers providing goods and/or services to residents of the identified facility. By way of example, if the identified facility is a detention facility, the categories of lists might include bail bondsmen, attorneys, probation officers, and the like. At 213 the outside part preferably selects at least one of the categories and at 214 a list of providers in the selected category is played for the calling party. The providers listed may be local to a geographic area of the identified facility and/or registered or otherwise eligible to provide goods and/or services to the residents of the identified facility. These providers may pay a fee to be included in one of the lists. Additional fees may be paid to include additional information about the provider in a list. For example the additional information may include a "tagline" or the like provided by the goods or service provider. Alternatively or additionally, fees may be paid by a provider to be presented at a beginning of a list. However, in accordance with embodiments of the present invention, if a reverse auction is conducted at 203, the winner of the auction may be listed first and/or auction participants may be listed in an ascending order, based on their bids. Subscribing professionals that did not take part in the auction may then be listed according to any other criteria, such as, payment of fees for preferential listing. As noted above, "winning" a reverse auction may entail more than, or something in addition to, offering goods or services at a lowest price or cost.

At 216 the calling party may select a provider from the played list. Resultantly, the selected provider is notified at 217 of their selection and at 220 the selected provider is preferably provided any other necessary information about the resident. The provider may be notified at 217 in a manner preselected by that provider, such as via telephone, wireless phone, email, voice mail, and/or the like. The information provided at 220 may include the name of the resident, any identification number associated with the resident, the reason the resident is in the controlled environment facility, and/or the like. Similarly as discussed above in relation to embodiment 100, the notification at 217 may employ a "follow me" approach wherein a series of communication mediums are used in an attempt to contact the professional in as timely manner as possible and at each point a voice mail or other messages may be left with pertinent information such as a call back number or website address to access for information. Also similar to as discussed above in relation to embodiment 100, the provider may be charged a fee to access this information. Additionally or alternatively, a three-way call, or conference call, might be initiated, or be allowed to be initiated, between the resident, selected provider(s) and outside party(ies).

Figure 3:
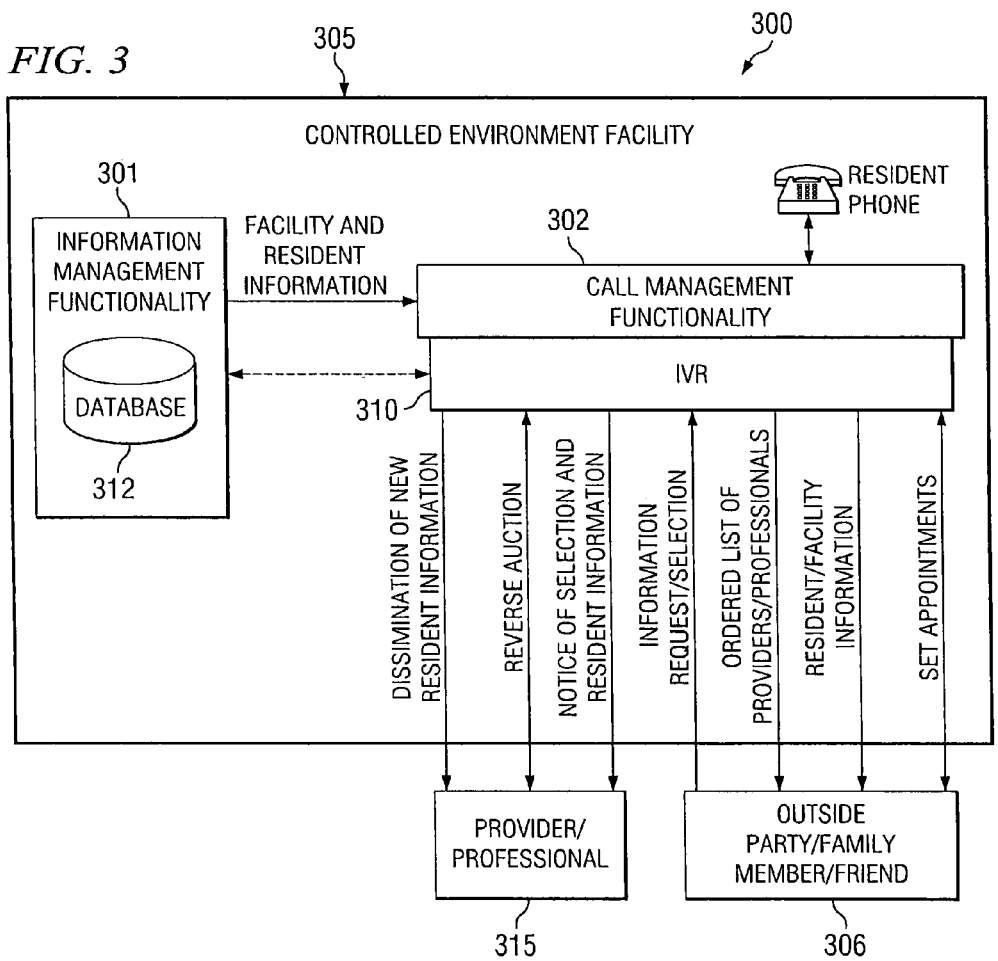
FIG. 3 is a diagrammatic illustration of embodiments of an information management system and a call management system adapted to employ embodiments of the present systems.

FIG. 3 is a diagrammatic illustration of embodiments of an information management system 301, and a call management system 302, adapted as example embodiment 300 of the present systems. Controlled environment facility information management functionality 301 preferably manages resident information and facility information for controlled environment facility 305. In accordance with embodiments of the present systems controlled environment facility call manager functionality 302 selectively provides resident information and/or selectively provides facility information to outside party 306 in an automated manner.

The resident information provided might include identity of the resident, a reason for the resident to be a resident of the controlled environment facility, booking information for the resident, time spent by the resident at the controlled environment facility, appointments for the resident, identity of family members of the resident, and/or the like. The facility information might include facility visitation hours, facility location facility administrative information and/or the like.

Alternatively or additionally, the present invention may provide outside party 306 directions to a website or telephone number where they may obtain resident information and/or facility information. The telephone number may be a "900" service number, and/or the website may charge a fee for access. IVR functionality 310 may be associated with, or included in call managing functionality 302. This IVR may selectively provide the resident information and/or facility information to a calling or called outside party. The IVR may provide this information during a call with the facility or a resident, or the information may be provided during a call to the aforementioned provided telephone number.

To carry out this dissemination of information the IVR may selectively route an outside call party to personnel who have desired information. Further, the IVR may enable an outside party to pre-arrange visitation with a resident, make deposits in a commissary account of a resident, order or refill prepaid calling cards for a resident, accept credit card information for use in funding a commissary account of a resident, manage a debit or other account associated with a resident, and/or the like. The IVR may be linked to facility information management functionality 301 and may be used to track a resident's activities and use of facility services. This may facilitate setting-up appointments between an outside party and a resident using the IVR. For example, facility information manager 301 may determine if a resident is eligible or available to take part in an appointment or visitation requested via IVR 310 and schedule the visitation or appointment accordingly.

In accordance with the present invention, various steps of the above described method embodiments, 100 and 200, may be carried out by the information management system 301 and or call management system 302. For example, information management functionality 301 may manage information related to entities that provide services and/or goods to residents of a facility. By way of example where the facility is a detention facility and the providers comprise at least one of bail bondsmen, attorneys, probation officers, etc. Further, information management system 301 may recognize entry of information for a new resident and prompt call management functionality 302 to disseminate pertinent information about the new resident to appropriate providers or professionals, such as via IVR 310. The reverse auction, employed by embodiments of the present invention, may be carried out via IVR 310 as well. Call manager functionality 302 may identify when a resident uses a resident telephone system for a first time and/or when a first telephone call is made to a telephone number. Call manager functionality 302 may include an outgoing IVR functionality. In response to call manager 302 recognizing that a call is a first call by a resident or that a call is a first call to a particular telephone number by a resident, IVR 310 may provide select portions of resident information to the called party. The disseminated resident information might include identity or the resident, reason for the resident being in a facility, and/or the like.

Information management system 301 and/or call management system 302 may provide functionality for receiving a call from the outside party to a provided telephone number, functionality for recognizing an ANI associated with the outside party, and functionality for matching the recognized automatic number identification with an automatic number identification associated with the processed telephone call from the resident to the outside party, which identifies the pertinent controlled environment facility. As noted above the IVR associated with call management system 302 and/or information management system 301 may provide the outside party categories of lists of providers authorized to provide goods and/or services to residents of the identified facility. This IVR functionality preferably also accepts selection of one of the categories from the outside party, plays an ordered list of providers in the selected category that may reflect the results of the aforementioned reverse auction, and accepts any selection, from the outside party, of a provider from the played list. The IVR functionality may then be used to notify selected provider 315 of the selection and to provide information about the subject resident to the provider.

In many controlled environment calling systems, such as prison phone systems, three-way calling is forbidden and often blocked. Monitoring and blocking of three way calls might be provided by controlled environment facility call manager functionality, such as call management system 302. However, in accordance with embodiments of the present invention, a three-way call might be initiated, or be allowed to be initiated, between the resident, a selected provider and an outside party. Further conference calls that include more than one provider, by way of example a conference call between, a jailed individual, an outside party who may be a surety, a bail bondsman, and an attorney, might be carried out in accordance with the present invention. Allowed three-way calls, or conference calls, might be carried-out under the control of call management system 302.

In accordance with the present invention information management functionality 301, call management functionality 302 and/or IVR 310 may be located at the facility, as illustrated in FIG. 3. However, information management functionality 301, call management functionality 302 and/or IVR 310 may be located at a central location outside of the facility, disposed in a decentralized manner at several locations, or otherwise located so as to receive or provide telephonic and/or data communications in accordance with the present invention.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for dissemination of information related to a resident of a controlled access environment facility, the method comprising:
    establishing a database of providers that provide at least one of goods or services to residents of said controlled environment facility;
    adding information about a new resident to a database of resident information;
    and disseminating, in an automated manner, at least a portion of the information about the new resident pertinent to providing at least one of a good or a service to providers of said at least one of a good or a service, wherein said adding information about the new resident to the database of resident information includes adding information about a third party associated with said new resident and said disseminating at least a portion of the information about the new resident includes disseminating information about said third party pertinent to providing at least one of a good or a service to providers of said at least one of a good or a service.

2. The method of claim 1 wherein said information about said third party pertinent to providing at least one of a good or a service includes information which a provider of a particular one of said at least one of a good or a service might employ to prequalify said new resident for provisioning of said at least one of a good or a service.

3. The method of claim 1 wherein said disseminating further comprises disseminating at least a portion of the information about the new resident to ones of said providers offering services directed to a class of residents to which said new resident belongs.

4. The method of claim 1 wherein said disseminating further comprises disseminating at least a portion of the information about the new resident to ones of said providers offering goods of use to a class of residents to which said new resident belongs.

5. The method of claim 1 wherein said information disseminated to said providers comprises at least one of: an identity of said resident, a reason for said resident to be a resident of said controlled environment facility, booking information for said resident, time spent by said resident at said controlled environment facility, appointments for said resident, and identity of family members of said resident.

6. The method of claim 1 wherein said disseminating comprises notifying each of said providers in a predetermined manner for that provider.

7. The method of claim 6 wherein said predetermined manner is at least one of, telephone, wireless phone, email, and voice mail.

8. The method of claim 1 wherein said controlled environment facility is a detention facility and said providers comprise professionals who provide services to arrestees.

9. The method of claim 1 wherein said controlled environment facility is a detention facility and said providers comprise at least one of bail bondsmen, attorneys and probation officers.

10. A method for dissemination of information related to a resident of a controlled access environment facility, the method comprising:
    establishing a database of providers that provide goods or services to residents of said controlled environment facility;
    adding information about a new resident to a database of resident information;
    disseminating, in an automated manner, at least a portion of the information about the new resident pertinent to providing at least one of a good or a service to providers of said at least one of a good or a service; and
    conducting a reverse auction among the providers to whom said information about said new resident is disseminated for offering said at least one of goods or services to said new resident.

11. The method of claim 10 wherein bids by providers in said reverse auction are based upon the provider's fee for providing at least one of a good or a service.

12. The method of claim 11 wherein bids by providers in said reverse auction are based, at least in part, upon a value added to at least one of a good or a service.

13. The method of claim 12 wherein said value added is a time-based guarantee for providing a service.

14. The method of claim 12 wherein said value added is a guaranteed delivery time for goods.

15. The method of claim 10 further comprising:
    processing a telephone call from said new resident of said controlled environment facility to an outside party; and
    providing a list reflecting the contents of said providers database to said outside party in an order reflective of results of said reverse auction.

16. The method of claim 15 wherein said providing is carried out before connection of said telephone call is completed.

17. The method of claim 15 wherein said providing compromises providing said outside party an automated message that provides instructions for accessing information related to said resident.

18. The method of claim 17 wherein said instructions compromise providing said outside party a website address where said list is available.

19. The method of claim 17 wherein said instructions comprise providing said outside party a telephone number.

20. The method of claim 19 further comprising:
    receiving a call from said outside party to the provided telephone number;
    recognizing an automatic number identification associated with said outside party;

matching the recognized automatic number identification with an automatic number identification associated with the processed telephone call from said resident to said outside party;

identifying a controlled environment facility from which said resident placed said processed call to said outside party;

providing said outside party categories of lists of providers providing at least one of goods or services to residents of the identified facility;

accepting a selection of one of said categories from said outside party;

playing a list of providers in the selected category arranged in order of results of said reverse auction;

accepting a selection by said outside party of a provider from the played list;

notifying the selected provider of said selection; and providing further information about said resident to said selected provider.

21. The method of claim 20 further comprising allowing a three-way call between said outside party, said new resident and said selected provider.

22. The method of claim 20 further comprising allowing a conference call including at least said new resident and said selected provider.

23. The method of claim 10 further comprising:

processing a telephone call from an outside party to said controlled environment facility; and providing, using interactive voice response functionality, said outside party automated options for gathering information about at least one of said controlled environment facility, one of said residents, and said providers.

24. The method of claim 23 wherein said providing compromises providing said outside party a website address where a list of said providers may be accessed, said list provided in an order of results of said reverse auction.

25. The method of claim 23 wherein said providing comprises providing said outside party a telephone number.

26. The method of claim 25 further comprising:

receiving a call from said outside party to the provided telephone number;

recognizing an automatic number identification associated with said outside party;

matching the recognized automatic number identification with an automatic number identification associated with the processed telephone call from said outside party to said controlled environment facility;

identifying said controlled environment facility as a result of said matching;

providing said outside party categories of lists of providers providing at least one of goods or services to residents of the identified facility;

accepting a selection of one of said categories from said outside party;

playing a list of providers in the selected category arranged in order of results of said reverse auction;

accepting a selection by said outside party of a provider from the played list;

notifying the selected provider of said selection; and providing further information about said new resident to said provider.

27. The method of claim 26 further comprising allowing a three-way call between said outside party, said new resident and said selected provider.

28. The method of claim 26 further comprising allowing a conference call including at least said new resident and said selected provider.

29. The method of claim 26 wherein said controlled environment facility is a detention facility and said categories comprise professionals who provide services to arrestees.

30. The method of claim 26 wherein said controlled environment facility is a detention facility and said categories comprise bail bondsmen, attorneys and probation officers.

31. A method for dissemination of information related to a resident of a controlled access environment facility, the method comprising:

maintaining a database of providers that provide at least one of goods or services to residents of said controlled environment facility, said database organized based on said at least one of goods or services offered by said providers and a class of residents to whom said providers offer said at least one of goods or services;

adding information about a new resident to a database of resident information;

and disseminating, in an automated manner, at least a portion of the information about the new resident pertinent to providing at least one of a good or a service to providers of said at least one of a good or a service that offer said at least one of a good or a service to residents of a class of residents to which said new resident belongs, wherein said adding information about the new resident to the database of resident information includes adding information about a third party associated with said new resident and said disseminating at least a portion of the information about the new resident includes disseminating information about said third party pertinent to providing at least one of a good or a service to providers of said at least one of a good or a service.

32. The method of claim 31 wherein said information about said third party pertinent to providing at least one of a good or a service includes information which a provider of a particular one of said at least one of a good or a service might employ to prequalify said new resident for provisioning of said at least one of a good or a service.

33. The method of claim 31 wherein said information disseminated to said providers comprises at least one of: an identity of said resident, a reason for said resident to be a resident of said controlled environment facility, booking information for said resident, time spent by said resident at said controlled environment facility, appointments for said resident, and identity of family members of said resident.

34. The method of claim 31 wherein said controlled environment facility is a detention facility and said providers comprise professionals who provide services to arrestees and said class of residents are residents of said detention facility charged with a particular offense.

35. A method for dissemination of information related to a resident of a controlled access environment facility, the method comprising:

maintaining a database of providers that provide at least one of goods or services to residents of said controlled environment facility, said database organized based on said at least one of goods or services offered by said providers and a class of residents to whom said providers offer said at least one of goods or services;

adding information about a new resident to a database of resident information;

disseminating, in an automated manner, at least a portion of the information about the new resident pertinent to providing at least one of a good or a service to providers of said at least one of a good or a service that offer said at least one of a good or a service to residents of a class of residents to which said new resident belongs; and conducting a reverse auction among the providers to whom said information about said new resident is disseminated for offering said at least one of goods or services to said new resident.

36. The method of claim 35 wherein bids by providers in said reverse auction are based upon the provider's fee for providing at least one of a good or a service.

37. The method of claim 36 wherein bids by providers in said reverse auction are based, at least in part, upon a value added to at least one of a good or a service.

38. The method of claim 37 wherein said value added is a time-based guarantee for providing a service.

39. The method of claim 37 wherein said value added is a guaranteed delivery time for goods.

40. The method of claim 35 further comprising:
processing a telephone call from said new resident of said controlled environment facility to an outside party; and
providing a list reflecting the contents of said providers database to said outside party in an order reflective of results of said reverse auction.

41. The method of claim 40 wherein said providing is carried out before connection of said telephone call is completed.

42. The method of claim 40 wherein said providing compromises providing said outside party an automated message that provides instructions for accessing information related to said resident.

43. The method of claim 42 wherein said instructions compromise providing said outside party a website address where said list is available.

44. The method of claim 42 wherein said instructions comprise providing said outside party a telephone number.

45. The method of claim 44 further comprising:
receiving a call from said outside party to the provided telephone number;
recognizing an automatic number identification associated with said outside party;
matching the recognized automatic number identification with an automatic number identification associated with the processed telephone call from said resident to said outside party;
identifying a controlled environment facility from which said resident placed said processed call to said outside party;
providing said outside party categories of lists of providers providing at least one of goods or services to residents of the identified facility;
accepting a selection of one of said categories from said outside party;
playing a list of providers in the selected category arranged in order of results of said reverse auction;
accepting a selection by said outside party of a provider from the played list;
notifying the selected provider of said selection; and
providing further information about said resident to said selected provider.

46. The method of claim 45 further comprising allowing a three-way call between said outside party, said new resident and said selected provider.

47. The method of claim 45 further comprising allowing a conference call including at least said new resident and said selected provider.

48. The method of claim 35 further comprising:
processing a telephone call from an outside party to said controlled environment facility; and
providing, using interactive voice response functionality, said outside party automated options for gathering information about at least one of said controlled environment facility, one of said residents, and said providers.

49. The method of claim 48 wherein said providing compromises providing said outside party a website address where a list of said providers may be accessed, said list provided in an order of results of said reverse auction.

50. The method of claim 48 wherein said providing comprises providing said outside party a telephone number.

51. A method for dissemination of information related to a resident of a controlled access environment facility, the method comprising:
maintaining a database of providers that provide at least one of goods or services to residents of said controlled environment facility, said database organized based on said at least one of goods or services offered by said providers and a class of residents to whom said providers offer said at least one of goods or services;
adding information about a new resident to a database of resident information;
disseminating, in an automated manner, at least a portion of the information about the new resident pertinent to providing at least one of a good or a service to providers of said at least one of a good or a service that offer said at least one of a good or a service to residents of a class of residents to which said new resident belongs;
conducting a reverse auction among the providers to whom said information about said new resident is disseminated for offering said at least one of goods or services to said new resident;
processing a telephone call from an outside party to said controlled environment facility;
providing, using interactive voice response functionality, said outside party automated options for gathering information about at least one of said controlled environment facility, one of said residents, and said providers, wherein said providing comprises providing said outside party a telephone number;
receiving a call from said outside party to the provided telephone number;
recognizing an automatic number identification associated with said outside party;
matching the recognized automatic number identification with an automatic number identification associated with the processed telephone call from said outside party to said controlled environment facility;
identifying said controlled environment facility as a result of said matching;
providing said outside party categories of lists of providers providing at least one of goods or services to residents of the identified facility;
accepting a selection of one of said categories from said outside party;
playing a list of providers in the selected category arranged in order of results of said reverse auction;
accepting a selection by said outside party of a provider from the played list;
notifying the selected provider of said selection; and
providing further information about said new resident to said provider.

52. The method of claim 51 further comprising allowing a three-way call between said outside party, said new resident and said selected provider.

53. The method of claim 51 further comprising allowing a conference call including at least said new resident and said selected provider.

54. The method of claim 51 wherein said controlled environment facility is a detention facility and said categories comprise professionals who provide services to arrestees.

55. The method of claim 51 wherein said controlled environment facility is a detention facility and said categories comprise bail bondsmen, attorneys and probation officers.

56. A system for dissemination of information from a controlled environment facility, the system comprising:
controlled environment facility information management configured to manage resident information and facility information, said resident information including at least information related to a new resident; and
controlled environment facility call manager configured to selectively disseminate at least one of at least a portion of said information related to a new resident and at least a portion of said facility information to at least one provider that provides at least one of goods or services to residents of said controlled environment facility in an automated manner, wherein said controlled environment facility call manager functionality is further configured to conduct a reverse auction among the providers to whom said information about said new resident is disseminated for offering said at least one of goods or services to said new resident.

57. The system of claim 56 wherein said call manager disseminates at least a portion of the information about the resident to ones of said providers offering services directed to a class of residents to which said new resident belongs.

58. The system of claim 56 wherein said call manager disseminates at least a portion of the information about the resident to ones of said providers offering goods of use to a class of residents to which said new resident belongs.

59. The system of claim 56 wherein said call manager notifies each of said providers in a predetermined manner for that provider.

60. The system of claim 59 wherein said predetermined manner is at least one of, telephone, wireless phone, email, and voice mail.

61. The system of claim 56 wherein said controlled environment facility is a detention facility and said providers comprise professionals who provide services to arrestees.

62. The system of claim 56 wherein said controlled environment facility is a detention facility and said providers comprise at least one of bail bondsmen, attorneys and probation officers.

63. The system of claim 56 wherein bids by providers in said reverse auction are based upon the provider's fee for providing at least one of a good or a service.

64. The system of claim 56 wherein bids by providers in said reverse auction are based, at least in part, upon a value added to at least one of a good or a service.

65. The system of claim 64 wherein said value added is a time-based guarantee for providing a service.

66. The system of claim 64 wherein said value added is a guaranteed delivery time for goods.

67. The system of claim 56 wherein said controlled environment facility call manager functionality further comprises:
means for receiving a call from said outside party to the provided telephone number;
means for recognizing an automatic number identification associated with said outside party;
means for matching the recognized automatic number identification with an automatic number identification associated with a processed telephone call from said new resident to said outside party;
means for identifying a controlled environment facility from which said new resident placed said processed call to said outside party;
means for providing said outside party categories of lists of providers providing at least one of goods or services to residents of the identified facility;
means for accepting a selection of one of said categories from said outside party;
means for playing a list of providers in the selected category arranged in order of results of said reverse auction;
means for accepting a selection by said outside party of a provider from the played list;
means for notifying the selected provider of said selection; and
means for providing further information about said resident to said provider.

68. The system of claim 67 wherein said controlled environment facility call manager functionality typically blocks three-way call attempts and said controlled environment facility call manager functionality allows a three-way call between said outside party, said new resident and said selected provider.

69. The system of claim 67 wherein said controlled environment facility call manager functionality typically blocks conference call attempts and said controlled environment facility call manager functionality allows a conference call including at least said new resident and said selected provider.

* * * * *